Patented July 27, 1954

2,684,964

UNITED STATES PATENT OFFICE 2,684,964

PRODUCTION OF MELAMINE

Harry L. Heckel, Jr., Prince George County, Va., assignor to Allied Chemical & Dye Corporation, a corporation of New York No Drawing. Application August 29, 1947, Serial No. 771,391

1 Claim. (Cl. 260—249.7)

This invention relates to the production of melamine from urea or from oxygen-containing urea condensation products such as cyanuric acid, ammelide and ammeline, or from mixtures of such reactants.

The decomposition of urea to form ammonia and cyanuric acid and/or ammelide on heating is known. It has been proposed to form melamine by heating urea or a pyrolysis product of urea such as cyanuric acid, ammelide, and ammeline at 275°–500° C. under superatmospheric pressures in an atmosphere of ammonia. A mol ratio of free ammonia:urea in the initial materials which form said reaction mixture of 4:1–20:1 is recommended for best results in accordance with this proposal. Although melamine is stated to be produced when the ratio of free ammonia:urea in the initial materials which form the reaction mixture is below 4:1, when the added ammonia mol ratio with urea is 4:1 or lower the operating pressure recommended is 600–1000 atmospheres. In accordance with the above procedure the partial pressure of ammonia developed during the reaction at low ratios of free ammonia:urea in the initial materials which form the reaction mixture amounts to about 400 atmospheres or more.

Objects of the present invention are to obtain melamine from urea or related compounds under less severe conditions than heretofore proposed and at the same time in yields greater than those obtained by other procedures. Other objects and advantages will appear hereinafter.

I have now found that a high yield of melamine is realized by heating urea as described in the next sentence, with any added ammonia limited to an amount such that the mol ratio in the input materials of any free ammonia:urea does not exceed one mol of free ammonia per mol of urea. The urea is heated to temperatures at which it is decomposed forming urea pyrolysis products which include ammonia, and the urea pyrolysis products are further heated up to temperatures at which melamine is formed, while the reaction mixture is maintained under pressures such that the partial pressure of ammonia (arising from any free ammonia in the input materials and from the ammonia produced by decomposition of the urea) is not greater than about the autogenous ammonia partial pressure ultimately developed when an equimolar mixture of urea and free ammonia is heated at 400° C. and at a loading density (defined as gram-mols of urea per 100 cc. closed reaction space) of 0.35. The pressures (chiefly due to ammonia and carbon dioxide) at which the urea pyrolysis products are heated to form melamine are superatmospheric; and preferably, the partial pressure of ammonia at least at the end of the heating period is at least about the autogenous ammonia partial pressure ultimately developed when an equimolar mixture of urea and ammonia is heated at 400° C. and at a loading density of 0.07 gram-mol of urea per 100 cc. closed reaction space.

Instead of urea, urea pyrolysis products from which melamine is formed may be subjected to the above conditions to convert these products into melamine. Thus the materials subjected to the melamine forming conditions of temperature and pressure may be one or more of the oxygen-containing triazine compounds into which urea is converted by heating, i. e. cyanuric acid, ammelide or ammeline. The conversions of these oxygen-containing triazines to melamine in accordance with the theoretical equations for the overall reactions do not involve either net consumption or net production of ammonia. But ammonia should be present in the gas phase during the conversion of these reactants to melamine in accordance with my process. The source of this ammonia may be a reactant itself decomposing to form ammonia, free ammonia added to or present in the reactants as an impurity, or a material which decomposes to form ammonia under the reaction conditions which may be added to or present in the reactants (the oxygen-containing triazine). Particularly when cyanuric acid is the initial reactant it is preferred to obtain the required ammonia pressure by adding to this reactant a small amount of free ammonia or material such as urea which will readily form free ammonia on heating.

Thus, in a process operated in accordance with my invention, a reaction mixture containing the melamine-forming pyrolysis products of urea, including ammonia, is heated under an ammonia partial pressure, which partial pressure is not greater than about 350 atmospheres but preferably is at least about 75 atmospheres at least at the end of the heating period; and any free ammonia in the initial materials which form the reaction mixture is not more than required to bring the atomic ratio of nitrogen: carbon in the input materials forming the reaction mixture to about 3:1. The maximum total pressure in the gas phase (normally due chiefly to ammonia and carbon dioxide) which is normally reached in operations in accordance with my invention is about 450 atmospheres;

and the total pressure of ammonia and carbon dioxide at least at the end of the heating period in the preferred form of my invention is at least about 100 atmospheres.

The principal by-product of my process is ammonium carbamate, formed from ammonia and carbon dioxide on cooling the reaction products. Ammonium carbamate may itself be converted to urea which may be employed as initial reactant in my process. Ammelide and ammeline, which may be converted to melamine by my process, are usually formed in small amounts as by-products when e. g. urea is the initial reactant.

The reaction according to my invention may be carried out either batchwise or continuously. The pressure may be autogenous or may be established by the aid of suitable pumps and valves. Since ammonia is formed in the conversion of urea to melamine, the partial pressures of ammonia which can be developed as the pyrolysis of urea to melamine at given temperature progresses will depend both upon the gram-mols of urea introduced per 100 cc. of closed reaction space (loading density), and upon the mol ratio of any free ammonia:urea in the input materials.

The pyrolysis of urea to melamine proceeds according to the equation: 6 urea→1 melamine +6 ammonia +3 carbon dioxide. For a batch operation in which the material to be treated is heated in a closed vessel without drawing off gaseous reaction products until the conclusion of the heating, the ammonia partial pressures which can be developed at given loading density of the closed reaction space and given ratio in the input reaction mass of any free ammonia:urea with given reaction temperature can be calculated using the above equation for the reaction and the Van der Wall equation of state for gaseous amonia. A like calculation can be made if other initial reactants than urea are employed. The loading density of the initial reactant and the proportion of any free ammonia in the input reaction mixture can thus be interadjusted on the basis of the calculation to give the desired range of ammonia partial pressures at the desired reaction temperatures.

In operating in a reaction vessel from which gaseous products may be withdrawn as the reaction progresses, the desired partial pressures of ammonia may be maintained by means of a gas vent set to vent gas at a total pressure corresponding to the desired ammonia partial pressure. This total pressure may be determined from the total pressures exerted by a series of mixtures of ammonia and carbon dioxide of known composition; roughly the ratio of total pressure:ammonia partial pressure equals the mol ratio of all gases present:ammonia present.

In a batchwise reaction in a closed reaction zone, the partial pressure of ammonia will rise as ammonia is formed in the reaction, ultimately becoming substantially constant when the reaction converting urea to melamine is practically over. The preferred minimum ammonia partial pressures referred to herein need not be maintained throughout a reaction, but the reaction conditions should be adjusted so that these pressures will be reached at least at the end of the heating period.

The reaction zone is preferably enclosed by corrosion-resistant material such as stainless steel, silver or glass.

The following examples are illustrative of my invention but are not intended to limit the scope of the invention.

The pyrolysis of urea in the examples was carried out in an electrically heated high pressure autoclave of KA2 alloy (18–8 chrome-nickel stainless steel). In examples 1–3 this autoclave was provided with a glass liner sealed at one end into which the urea was weighed. In examples 2 and 3 the liner was covered with a loosely fitting cap. The reaction space in the autoclave with liner was about 133 cc.

The autoclave containing a charge of urea was cooled in a Dry Ice bath and the desired amount of ammonia was distilled into the autoclave through a valve from a graduated container. The autoclave was then closed off and heated to reaction temperature. After a run had been completed the autoclave was cooled by an air blast and when the temperature had dropped to about 150° C. the autoclave was vented through an ice-cooled trap to the atmosphere. (In Example 4, the trap was cooled by solid carbon dioxide.) Temperature was measured by means of a thermocouple in a well passing longitudinally down the center of the autoclave.

The ammonium carbamate formed from the ammonia and carbon dioxide present as they were cooled, which represented the principal product formed in addition to melamine, collected in the trap when the autoclave was vented. The solid non-volatile products of reaction were found in the glass liner within the autoclave. Melamine of about 90% purity or better was recovered from the solid products by extracting them with hot water in moderate excess of that required to dissolve a like quantity of melamine, then crystallizing the melamine from the water solution. The melamine yields quoted are for this once crystallized melamine, in mol percent of the yield expected from quantitative conversion of urea to melamine and water; i. e. the yields are in percent of urea nitrogen converted to melamine nitrogen. The quoted yields do not include melamine remaining dissolved in the water left from the crystallization. Melamine was identified by melting point, sublimation behavior, solubility in water and nitrogen analysis.

*Example 1.*—0.5 mol of urea and 0.5 mol of ammonia were charged to the autoclave as described above. The autoclave was heated during about 110 minutes to 350° C. and was maintained for one hour at a temperature of about 344°–350° C. The autoclave was then cooled and the products were separated as described above. The yield of melamine thus obtained was 42.4 mol percent based on quantitative conversion of urea to melamine and water, i. e. based on urea nitrogen converted to melamine nitrogen; or 84.8% of theory based on quantitative conversion of urea to melamine, ammonia and carbon dioxide. The partial pressure of ammonia reached at the end of the heating period amounted approximately to 300 atmospheres. The total pressure at the end of the heating period amounted to about 400 atmospheres.

*Example 2.*—0.5 mol of urea and 0.5 mol of ammonia charged to the autoclave as in Example 1 were heated over the course of one hour to 300° C. and the reaction mixture was maintained at a temperature of about 296°–304° C. for one-half hour. The yield of melamine thus obtained and isolated as in Example 1 was 38.1%, based on urea nitrogen converted to nitrogen in the product. On the same basis, the ammonium carbamate yield was 25.4%, intermediates insoluble in hot water were 5.7%, and urea recovered was 12.7%. The partial pressure of ammonia reached at the end of the heating period was about 200 atmospheres; and the total pressure at the end of the heating period was about 250–300 atmospheres.

*Example 3.*—1.09 mols of urea and 0.22 mol of ammonia introduced into the autoclave as in Example 1 were heated in the autoclave over the course of about 70 minutes to 300° C. and the resulting reaction mixture was maintained at about 297°–300° C. for one-half hour. A 27.5% yield of melamine was isolated as in Example 1. The partial pressure of ammonia reached at the end of the heating period was about 250 atmospheres, and the total pressure at the end of the heating period was about 300–350 atmospheres.

*Example 4.*—0.1 mol of urea and 0.1 mol of ammonia were introduced as described above into a stainless steel autoclave, without a liner, having a capacity of 144 cc. The autoclave was heated to about 400° C. and was maintained for 5 minutes at that temperature. The autoclave was then cooled by a stream of air to about 125° C. and ammonia and ammonium carbamate were distilled out at this temperature into a Dry Ice trap and water-cooled sublimation tube. The yield of melamine, based on urea nitrogen converted to melamine nitrogen, obtained by this procedure and isolated as previously described, was 24%. The partial pressure of ammonia reached at the end of the heating period was about 75 atmospheres, and the total pressure at the end of the heating period was about 100 atmospheres.

*Example 5.*—0.5 mol of urea and 0.5 mol of ammonia were introduced into the 144 cc. stainless steel autoclave, without a liner, as in Example 4, and the reactor was heated to 400° C. in 1½ hours, held at that temperature for 15 minutes, and allowed to cool overnight with the lagging removed. Ammonia was vented from the bomb, and the solid products weighing 28.4 gm. were separated by heating a flask containing the solid products for 2.1 hours on a boiling water bath to drive off ammonium carbamate to a sublimation tube, extracting the residue with 150 cc. of boiling water, filtering, and allowing melamine to crystallize from the filtrate. The yields of products thus obtained, by weight on the urea taken, were ammonium carbamate—19.8%, melamine—20.6%, hot water insoluble—12.5%, urea—37.3%. The yield of melamine based on urea nitrogen converted to melamine nitrogen was 29.4%. The partial pressure of ammonia at the end of the heating period in this experiment was about 325–350 atmospheres and the total pressure in the gas phase was about 450 atmospheres.

Besides ammonia partial pressure, reaction temperature and reaction time are conditions which influence the results obtained in the conversion of urea to melamine. The effect of these variables in interrelated, as discussed below. Ranges for these variables which are preferred as giving especially significant improvements over other procedures when these ranges are adopted in accordance with my invention are pointed out below.

reaction temperatures below 300° C. by the process of my invention; but I prefer to employ reaction temperatures of at least about 300° C. since with reaction temperatures as low as 250° C. the product is mostly an intermediate product of urea decomposition containing compounds such as cyanuric acid, ammelide, and/or ammeline, ammonia, and carbon dioxide. Much higher temperatures may be used, e. g. 450° C., and will hasten the reaction but they may result in more severe corrosion than is obtained at lower temperatures.

If it is desired to operate at relatively low temperatures, say about 300° C., operation with ammonia partial pressures in the upper range toward 350 atmospheres, e. g. 200 atmospheres or more, and with about 1 mol of free ammonia introduced per mol of urea introduced is advantageous as giving better yields than operation with lower values for ammonia partial pressures and ammonia:urea mol ratio in the input reaction mass. The total pressure is also lower at given partial pressure of ammonia as ammonia:urea mol ratios in the input reaction mass are increased, since no carbon dioxide accompanies this free ammonia as it does ammonia evolved from urea. Even at 300° C. or below, however, I have found no advantage in yields on increasing the mol ratio in the input reaction mass of free ammonia:urea above 1:1 or on increasing the partial pressure of ammonia in the gas phase in the reaction zone above the value of 350 atmospheres as hereinabove set forth.

At short reaction times, the extent to which the reaction occurs at given temperature is dependent on the reaction time at that temperature; the time necessary for substantial conversion is shorter the higher the reaction temperature. The reaction should be continued until substantial conversion of the reactants to melamine has been obtained. The point at which substantial conversion of the reactants to melamine has occurred may be ascertained by any desired test for the presence of melamine in the reaction mixture. If the reaction time is too short at given temperature, urea may be decomposed chiefly to an intermediate reaction mixture in which oxygen-containing triazines predominate rather than melamine.

In general after a reaction time of one-half hour the pyrolysis reaction converting urea to melamine by the process of my invention is virtually over. At temperatures of the order of 400° C. the reaction is practically over in a few minutes. However, the reaction time even at 400° C. or more may be far longer than required to bring the pyrolysis to melamine practically to an end since even on heating at temperatures above 400° C. melamine shows little or no decomposition. Thus, after a certain time which depends on reaction temperature, the extent of reaction becomes practically independent of the reaction time.

It is not necessary that reactants specified for my process be charged as such to the reactor. They may instead be formed in situ from other reactants. The formation from other reactants may be only transitory. For example, cyanic acid and ammonia, or ammonium cyanate, may be employed as the initial reactant instead of urea since these compounds on heating form urea and its initial pyrolysis products. Oxygen-containing condensation products of urea such as biuret may likewise be employed. Such reactants may be pyrolyzed to melamine in accordance with my invention under the conditions described herein as suitable for pyrolysis of urea to melamine. However, if urea-forming reactants or reactants forming cyanuric acid, etc. are to be used instead of the reactants above specified, the materials used as initial reactants should not be capable of forming large quantities of free water in their pyrolysis to urea or the like. Thus ammonium carbamate, for example, is not suitable as an initial reactant replacing urea in my process, although the presence of some ammonium carbamate along with the input reaction mass is not necessarily harmful.

If desired, inert gases such as nitrogen and/or inert reaction media such as biphenyl may be introduced into the reactor in addition to the initial materials which form the reaction mixture; but in general such additions are not made in my process.

I claim:

In a process for the production of melamine by heating urea, exposed to a chrome-nickel stainless steel surface, to elevated temperatures under superatmospheric pressures to decompose the urea with formation of melamine and in addition thereto, ammonia and carbon dioxide as gaseous pyrolysis products of the urea, the improvement which consists in introducing into the reaction zone ammonia from an external source in amounts in the range between about 0.2 and about 1 mol per mol of urea introduced therein, maintaining reaction temperatures at about 300° C., and developing total pressures in the gas phase in contact with said reaction mixture of at least about 300 atmospheres and at most about 350 atmospheres.

References Cited in the file of this patent

UNITED STATES PATENTS

| Number | Name | Date |
| --- | --- | --- |
| 2,371,480 | Swain | Mar. 15, 1945 |
| 2,396,193 | Paden | Mar. 5, 1946 |
| 2,512,590 | Swain | June 20, 1950 |
| 2,543,762 | Forbes | Feb. 20, 1951 |
| 2,549,492 | Lee | Apr. 17, 1951 |
| 2,566,231 | Paden | Aug. 28, 1951 |

FOREIGN PATENTS

| Number | Country | Date |
| --- | --- | --- |
| 583,504 | Great Britain | Dec. 19, 1946 |

OTHER REFERENCES

Diario Oficial (Brazil), May 13, 1943, Secção III, p. 1023.